United States Patent
Malagrino, Jr.

(10) Patent No.: US 7,048,452 B2
(45) Date of Patent: May 23, 2006

(54) TRANSCEIVER GUIDE RAIL WITH HEAT SINK GUIDE

(75) Inventor: Gerald Daniel Malagrino, Jr., Rochester, MN (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 10/959,529

(22) Filed: Oct. 6, 2004

(65) Prior Publication Data

US 2005/0100292 A1    May 12, 2005

Related U.S. Application Data

(60) Provisional application No. 60/518,815, filed on Nov. 10, 2003.

(51) Int. Cl.
*G02B 6/36* (2006.01)

(52) U.S. Cl. ...................................................... 385/92
(58) Field of Classification Search ...................... None
See application file for complete search history.

(56) References Cited

U.S. PATENT DOCUMENTS

| | | | |
|---|---|---|---|
| 4,834,173 A * | 5/1989 | Weiss et al. ................. | 165/159 |
| 6,419,523 B1 | 7/2002 | Jones et al. ................. | 439/607 |
| 6,450,698 B1 * | 9/2002 | Chen et al. ................. | 385/88 |
| 6,612,868 B1 * | 9/2003 | Hwang ........................ | 439/607 |
| 6,780,053 B1 * | 8/2004 | Yunker et al. ............... | 439/607 |
| 6,788,540 B1 * | 9/2004 | Kruger et al. ............... | 361/719 |
| 6,793,517 B1 * | 9/2004 | Neer et al. .................. | 439/372 |
| 6,811,413 B1 * | 11/2004 | Keeble et al. ................ | 439/79 |
| 6,866,544 B1 * | 3/2005 | Casey et al. ................. | 439/607 |
| 2003/0236019 A1 | 12/2003 | Hanley et al. ............... | 439/372 |
| 2004/0027816 A1 * | 2/2004 | Ice .............................. | 361/797 |

* cited by examiner

*Primary Examiner*—John D. Lee
*Assistant Examiner*—Mike Stahl
(74) *Attorney, Agent, or Firm*—Allen, Dyer, Doppelt, Milbrath & Gilchrist, P.A.

(57) ABSTRACT

The latest 10 Gb/s optical transceivers include large heat sinks with heat dissipating fins or pins extending from an upper surface thereof, which can cause difficulties when the transceivers are passed through an opening of a faceplate onto the guide rail of a host device. Often the heat dissipating fins or pins will contact an edge of the faceplate opening causing a series of ratcheting impacts that can damage the fins or pins. Accordingly, the present invention provides a guide rail with a resilient arm extending therefrom comprised of a vertical section extending along the side of the transceiver and a horizontal section extending above the top of the heat sink, but below the edge of the faceplate. A lead-in section extends outwardly and upwardly from the horizontal section providing a camming surface for guiding the transceiver into position.

17 Claims, 4 Drawing Sheets

TRANSCEIVER GUIDE RAIL WITH HEAT SINK GUIDE

CROSS-REFERENCE TO RELATED APPLICATIONS

The present invention claims priority from U.S. patent application Ser. No. 60/518,815 filed Nov. 10, 2003, which is incorporated herein by reference.

TECHNICAL FIELD

The present invention relates to a guide rail for an optical transceiver device, and in particular to a guide rail with a guide for ensuring that the heat sink fins extending from the optical transceiver housing are not damaged during insertion.

BACKGROUND OF THE INVENTION

Traditionally, pluggable small form factor optical transceivers have been supported on a host circuit board utilizing a cage 1, see FIG. 1, such as the one disclosed in U.S. Pat. No. 6,419,523 issued Jul. 16, 2002 to Hon Hai Precision Ind. Co., which completely surrounds the transceiver module except for a few holes 2 in the top 3, providing good EMI protection. Unfortunately, the amount of heat dissipation is greatly reduced, as air flow over the transceiver module is limited. Moreover, since the transceiver module is completely enclosed, no additional thermally conductive surfaces can be mounted thereto for added heat dissipation.

With reference to FIG. 2, with the advent of 10 Gb/s optical transceivers 11, which require heat sinks 12, including large heat-sinking pins or fins 12a extending therefrom, for dissipating the large amounts of heat generated therein, open top guide rails 13, have become a more logical choice of support for a host circuit board 15. Unfortunately, during insertion into the guide rail 13, the large fins 12a occasionally contact an edge of an opening in a faceplate 14, causing a ratcheting series of impacts, which can damage the fins 12a, i.e. hamper their ability to dissipate heat.

An object of the present invention is to overcome the shortcomings of the prior art by providing a transceiver guide rail with a guide for facilitating insertion of a transceiver into the guide rail without damaging the heat sink fins extending therefrom.

SUMMARY OF THE INVENTION

Accordingly, the present invention relates to a guide rail for mounting an optical transceiver, which has a heat sink extending therefrom, onto a host circuit board of a host device, which has a faceplate with an opening for receiving the optical transceiver, comprising:

a first side, a second side and a rear frame member for receiving the optical transceiver and guiding the transceiver into position on the host circuit board;

a first arm extending from the first side proximate the opening above the heat sink and below an edge of the opening for guiding the optical transceiver into position, thereby preventing contact between the heat sink and the faceplate.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
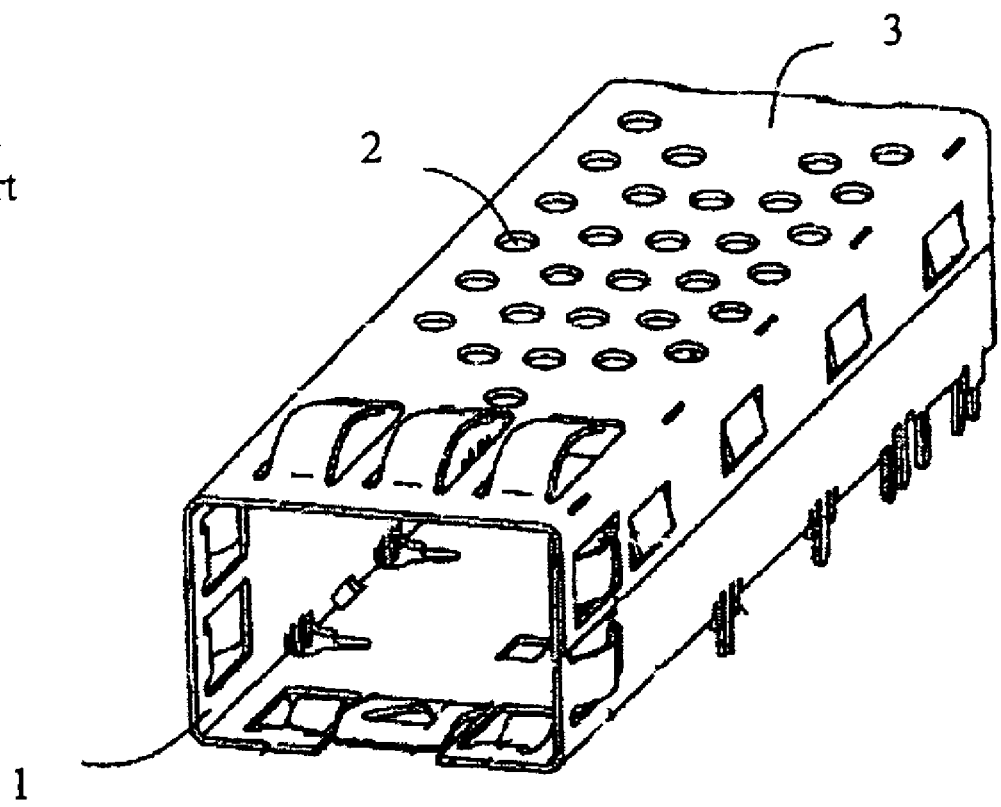
FIG. 1 is an isometric view of a conventional optical transceiver cage.
Figure 2:
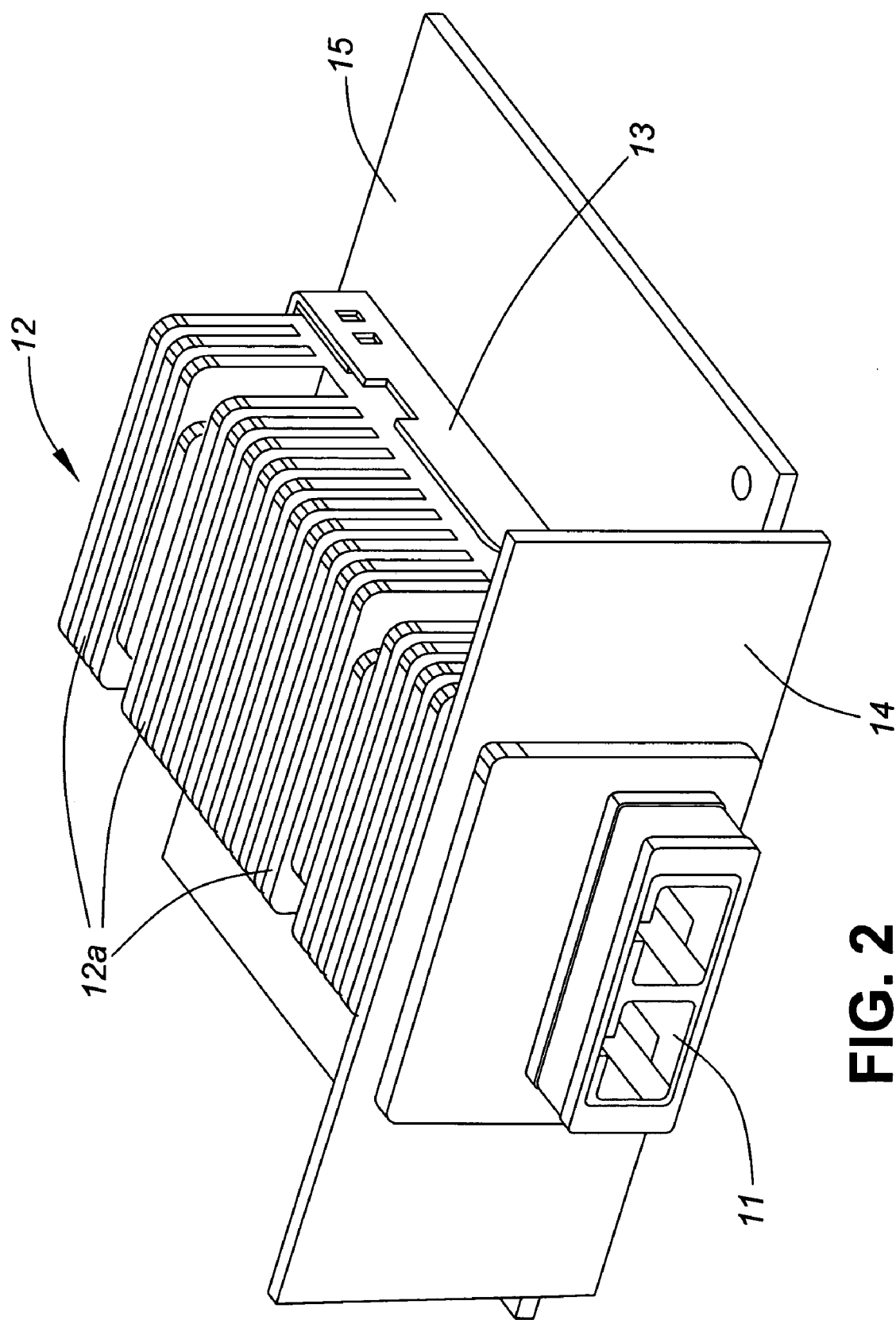
FIG. 2 is an isometric view of a conventional 10 Gb/s optical transceiver.
Figure 3:
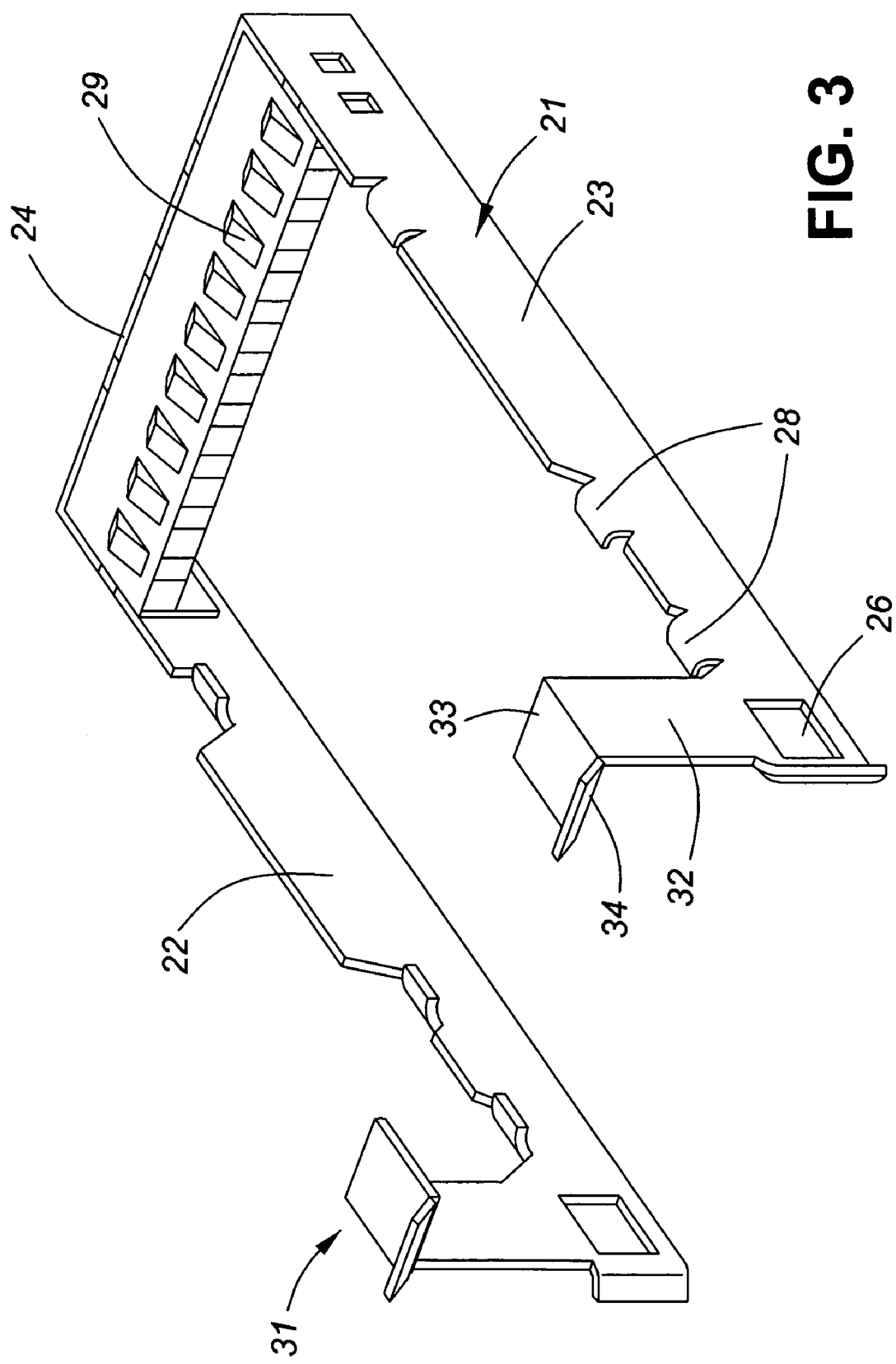
FIG. 3 is an isometric view of a guide rail according to the present invention.
Figure 4:
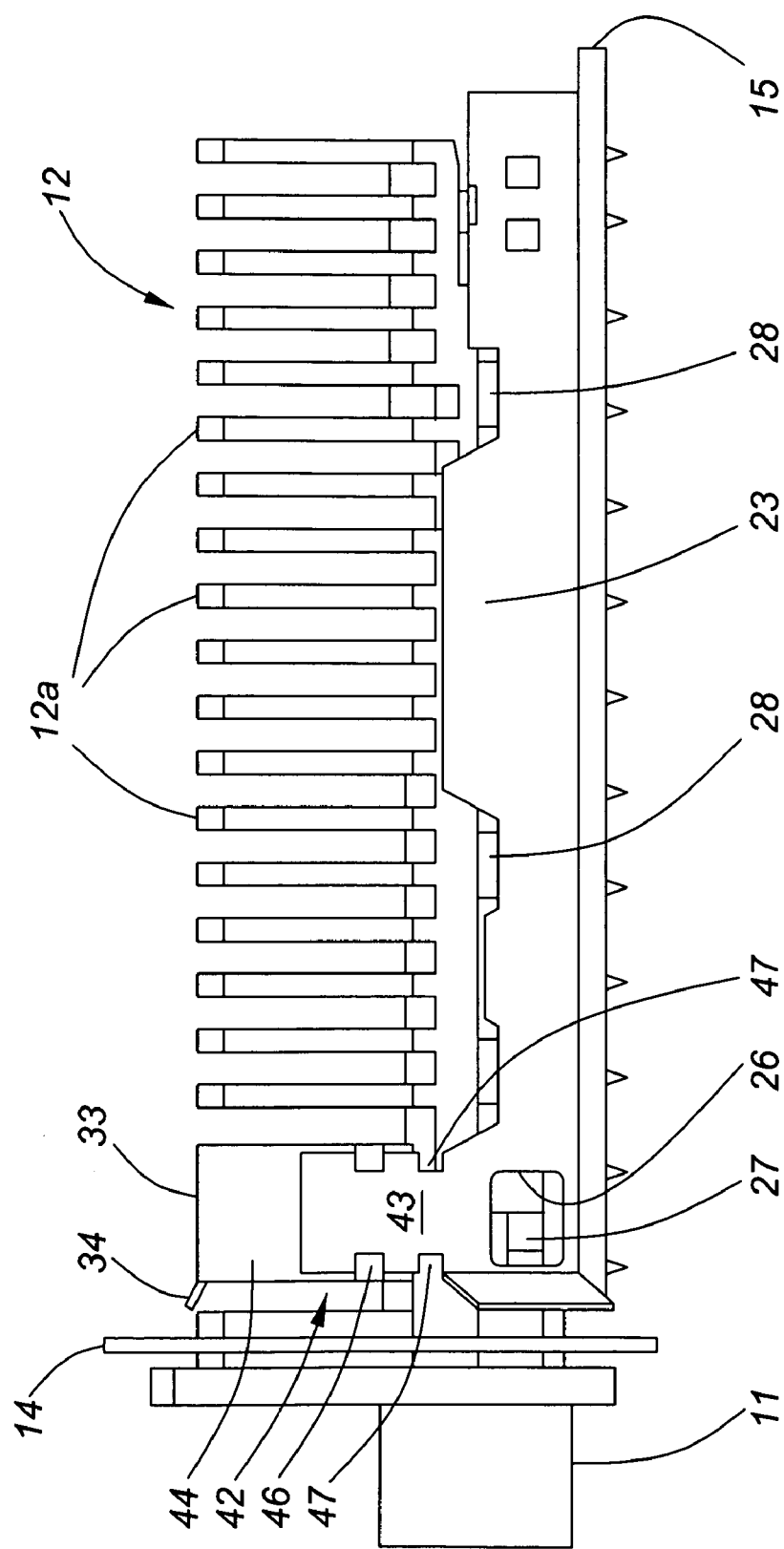
FIG. 4 is a side view of another embodiment of the guide rail according to the present invention.

With reference to FIGS. 3 and 4, a guide rail 21, according to the present invention, includes a metallic frame with a left side 22, a right side 23 and a rear section 24. Each of the left and right sides 22 and 23, respectively, includes an opening 26 at a front end thereof for receiving a latching member 27 extending from the transceiver 11, as detailed in co-pending U.S. patent application Ser. No. 2003/0236019, which is incorporated herein by reference. Alignment tabs 28 are bent from each of the left and right sides 22 and 23, respectively, for engaging the undersurface of the heat sink 12, thereby guiding the transceiver module 11 into position. A shroud 29 extends from the rear section 24 for covering an electrical connector (not show), which connects the transceiver module 11 to the host circuit board 15.

L-shaped arms 31, which extend upwardly from proximate the ends of the left and right sides 22 and 23, respectively, include a planar vertical section 32 extending above the height of the heat sink fins 12a, a planar horizontal section 33 extending perpendicular to the vertical section 32 over top of the heat sink fins 12a, and a bent lead-in section 34 extending outwardly and upwardly from the horizontal section 33. The lead-in section 34 extends upwardly at an acute angle, e.g. 45°, from the horizontal section 33, i.e. at an acute angle to the direction of insertion of the module 11 into the rail 21. During insertion, the lead-in section 34 provides a camming surface for guiding the top of the heat sink fins 12a underneath of the horizontal section 33, which is wide enough, e.g. the spacing of three or four heat sink fins 12a, to prevent the heat sink fins 12a from ratcheting thereon. The inner end of the lead-in section 34 is positioned below the edge of the opening in the faceplate 14, whereby the lead-in section guides the heat sink fins away from the faceplate 14 during insertion. Preferably, the outer free end of the lead-in section 34 is also positioned below the edge of the opening in the faceplate 14 to ensure that the heat sink fins 12a do not contact the faceplate 14 during insertion. Preferably, the arms 31 are contiguous with the guide rail 21, and made of a resilient metal enabling the arms 31 to bend during insertion, but ensuring that they provide a spring biasing force pushing the transceiver 11 down into position.

FIG. 4 illustrates a second embodiment of the present invention in which the vertical section 42 is extendable to various vertical positions to accommodate heat sink fins 12a with different heights. The vertical section 42 comprises a first base portion 43 extending from the guide rail 23 and a second moveable portion 44, slideable relative to the first base portion 43. Tabs 46 extending from the sides of the second moveable portion 44 enable the second moveable portion 44 to be adjusted and then locked into a desired position. Other means for locking the second moveable portion 44 in position are possible, in particular, if the different heat sink fin heights are known, the vertical section 42 could have predetermined notches 47 for receiving the tabs 46 or some other projection extending from the second moveable portion 44.

I claim:

1. A guide rail for mounting an optical transceiver, which has a heat sink extending therefrom, onto a host circuit board of a host device, which has a faceplate with an opening for receiving the optical transceiver, comprising;
    a first side, a second side and a rear frame member for receiving the optical transceiver and guiding the transceiver into position on the host circuit board;
    a first arm extending from the first side proximate the opening above the heat sink and below an edge of the opening for guiding the optical transceiver into position, thereby preventing contact between the heat sink and the faceplate; and
    a second arm extending from the second side proximate the opening above the heat sink and below the edge of the opening for guiding the optical transceiver into position, thereby preventing contact between the heat sink and the faceplate.

2. The guide rail according to claim 1, wherein the first arm includes a vertical section extending perpendicular to the first side, and a horizontal section for extending over top of a portion of the heat sink.

3. The guide rail according to claim 2, further comprising a camming surface extending from the horizontal section for guiding the heat sink below the horizontal section.

4. The guide rail according to claim 3, wherein the horizontal section is resilient for biasing the optical transceiver into position when the horizontal section is bent by the heat sink.

5. The guide rail according to claim 2, wherein the vertical section is adjustable for accommodating transceivers with various heights.

6. The guide rail according to claim 5, wherein the vertical section includes a first base portion and a second extendable portion slideable relative to the base portion.

7. The guide rail according to claim 6, wherein the first base portion includes notches at predetermined locations for receiving a projection from the second extendable portion.

8. The guide rail according to claim 2, wherein the heat sink includes spaced apart rows of pins or fins; and wherein the horizontal section is wider than three rows of pins or fins.

9. A guide rail for mounting an optical transceiver, which has a heat sink extending therefrom, onto a host circuit board of a host device, which has a faceplate with an opening for receiving the optical transceiver, comprising:
    a first side, a second side and a rear frame member for receiving the optical transceiver and guiding the transceiver into position on the host circuit board; a first arm extending from the first side proximate the opening above the heat sink and below an edge of the opening for guiding the optical transceiver into position, thereby preventing contact between the heat sink and the faceplate; wherein the first arm is adjustable for accommodating heat sinks with various heights.

10. The guide rail according to claim 9, wherein the first arm comprises a base portion, a moveable portion adjustable relative to the base portion, and a horizontal section extending from the moveable portion over top of the heat sink.

11. The guide rail according to claim 10, wherein the base portion includes notches at predetermined locations for receiving a projection from the moveable portion.

12. The guide rail according to claim 10, wherein the heat sink includes spaced apart rows of pins or fins; and wherein the horizontal section is wider than three rows of pins or fins.

13. The guide rail according to claim 10, further comprising a lead-in section extending outwardly and upwardly from the horizontal section for guiding the heat sink below the horizontal section.

14. The guide rail according to claim 15 wherein the first arm includes a camming section at an acute angle to an insertion direction for guiding the heat sink below the first arm.

15. A guide rail for mounting an optical transceiver, which has a heat sink extending therefrom, onto a host circuit board of a host device, which has a faceplate with an opening for receiving the optical transceiver, comprising:
    a first side, a second side and a rear frame member for receiving the optical transceiver and guiding the transceiver into position on the host circuit board; and
    a first arm extending from the first side proximate the opening above the heat sink and below an edge of the opening for guiding the optical transceiver into position, thereby preventing contact between the heat sink and the faceplate; wherein the first arm is resilient, thereby providing a biasing force on the heat sink for guiding the transceiver into position.

16. The guide rail according to claim 15, wherein the heat sink includes spaced apart rows of pins or fins; and wherein the first arm is wider than three rows of pins or fins.

17. The guide rail according to claim 15, further comprising a second arm extending from the second side proximate the opening above the heat sink and below the edge of the opening for guiding the optical transceiver into position, thereby preventing contact between the heat sink and the faceplate.

* * * * *